United States Patent [19]
Aspen et al.

[11] Patent Number: 6,036,107
[45] Date of Patent: Mar. 14, 2000

[54] CONTROL VALVE ARRANGEMENT FOR SPRAYING SYSTEMS

[75] Inventors: Randal S. Aspen, Oswego; Gary Paulsen, Batavia; Eric Petersen, North Aurora, all of Ill.

[73] Assignee: Spraying System Co., Wheaton, Ill.

[21] Appl. No.: 09/052,666

[22] Filed: Mar. 31, 1998

[51] Int. Cl.[7] .............................. B05B 1/16; B05B 1/30
[52] U.S. Cl. .......................... 239/170; 239/159; 239/124; 239/127; 239/569; 239/600; 137/883; 137/884; 137/887; 251/148; 285/124.1
[58] Field of Search .................. 239/159, 170, 239/124, 127, 569, 600; 251/148; 137/883, 884, 887; 285/124.1, 124.2, 124.5, 367, 363

[56] References Cited

U.S. PATENT DOCUMENTS

| | | | |
|---|---|---|---|
| 2,834,368 | 5/1958 | Gray | 137/884 X |
| 3,234,964 | 2/1966 | Tinsley et al. | 137/884 |
| 4,252,274 | 2/1981 | Kubacak | 239/170 X |
| 5,205,520 | 4/1993 | Walker | 285/124.1 X |
| 5,294,156 | 3/1994 | Kumazaki et al. | 285/124.2 |
| 5,354,101 | 10/1994 | Anderson, Jr. | 285/124.5 X |
| 5,360,036 | 11/1994 | Kieper | 251/148 X |
| 5,433,380 | 7/1995 | Hahn | 239/159 X |
| 5,529,088 | 6/1996 | Asou | 137/884 X |
| 5,699,834 | 12/1997 | Hayashi et al. | 137/884 |
| 5,881,773 | 3/1999 | Lukas et al. | 285/124.5 X |

*Primary Examiner*—Andres Kashnikow
*Assistant Examiner*—Robin O. Evans
*Attorney, Agent, or Firm*—Leydig, Voit & Mayer, Ltd.

[57] ABSTRACT

A spraying system is provided with a plurality of spray sections, a discharge line coupled to each of the spray sections, and a control valve connected to each discharge line for regulating the flow of liquid from the discharge line to the spray section. The control valves are mounted in side-by-side relation and each have a housing with outwardly projecting retaining flanges formed thereon. The spraying systems also including plastic mounting clamps for connecting together the retaining flanges of adjacent control valves. The plastic mounting clamps each having separate first and second clamping members. The first and second clamping members each having a respective retaining section secured in overlying relation to the retaining flanges of adjacent control valves for captively securing the retaining flanges together.

56 Claims, 7 Drawing Sheets

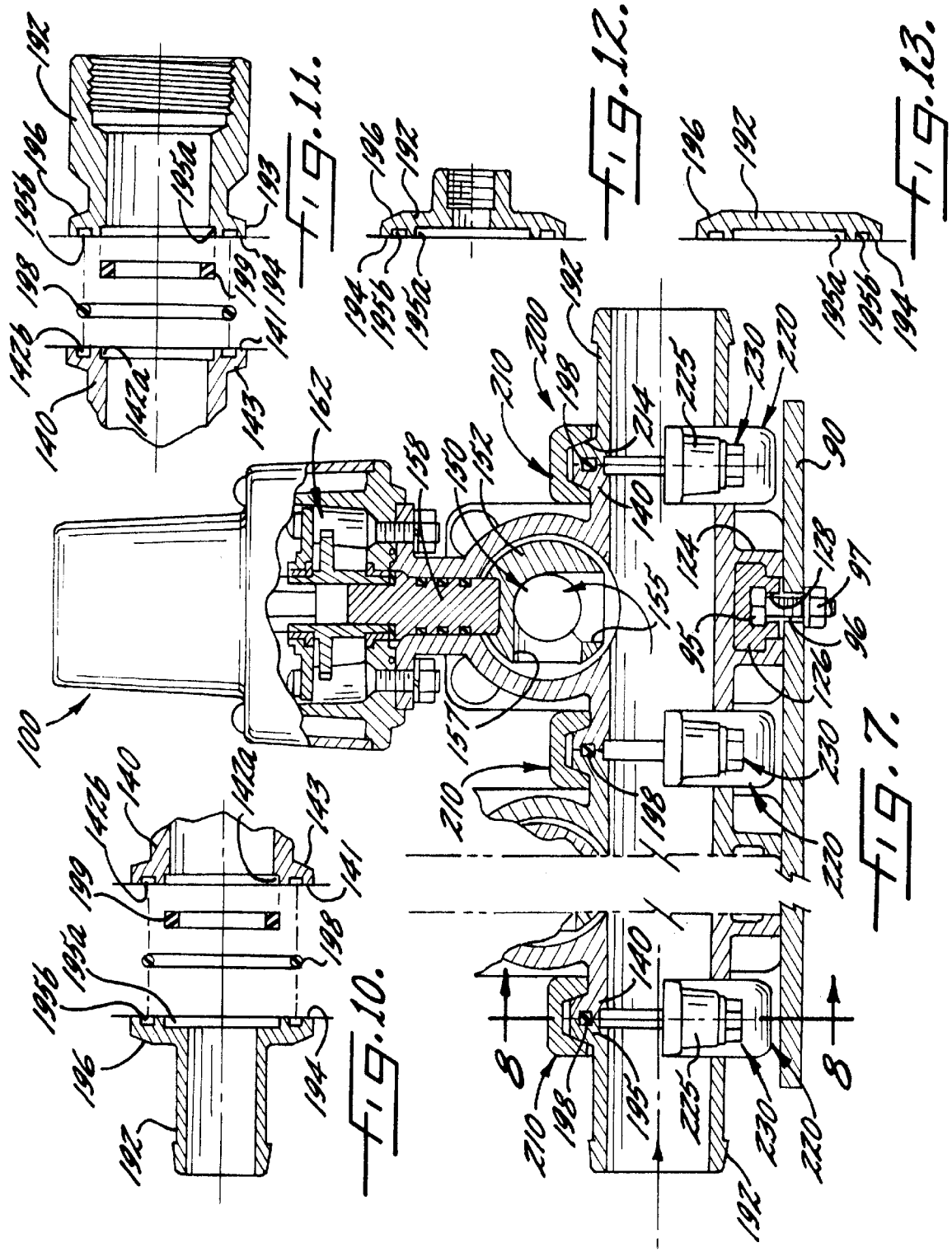

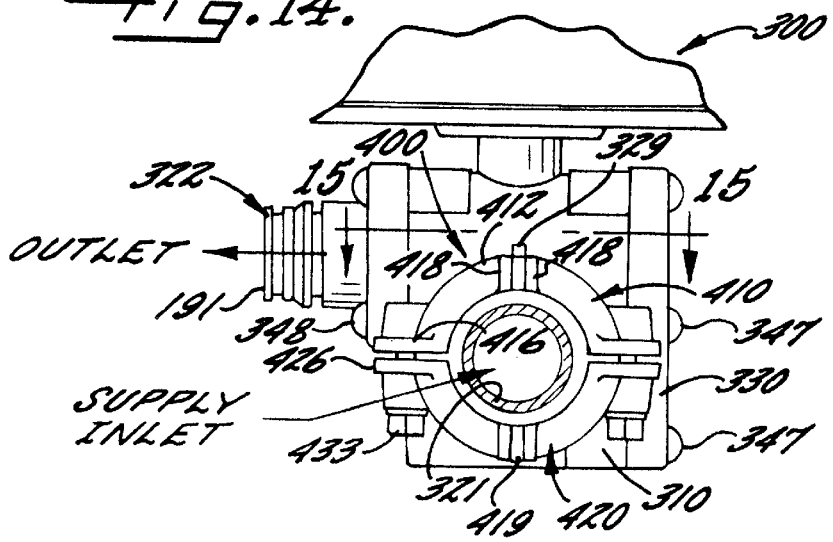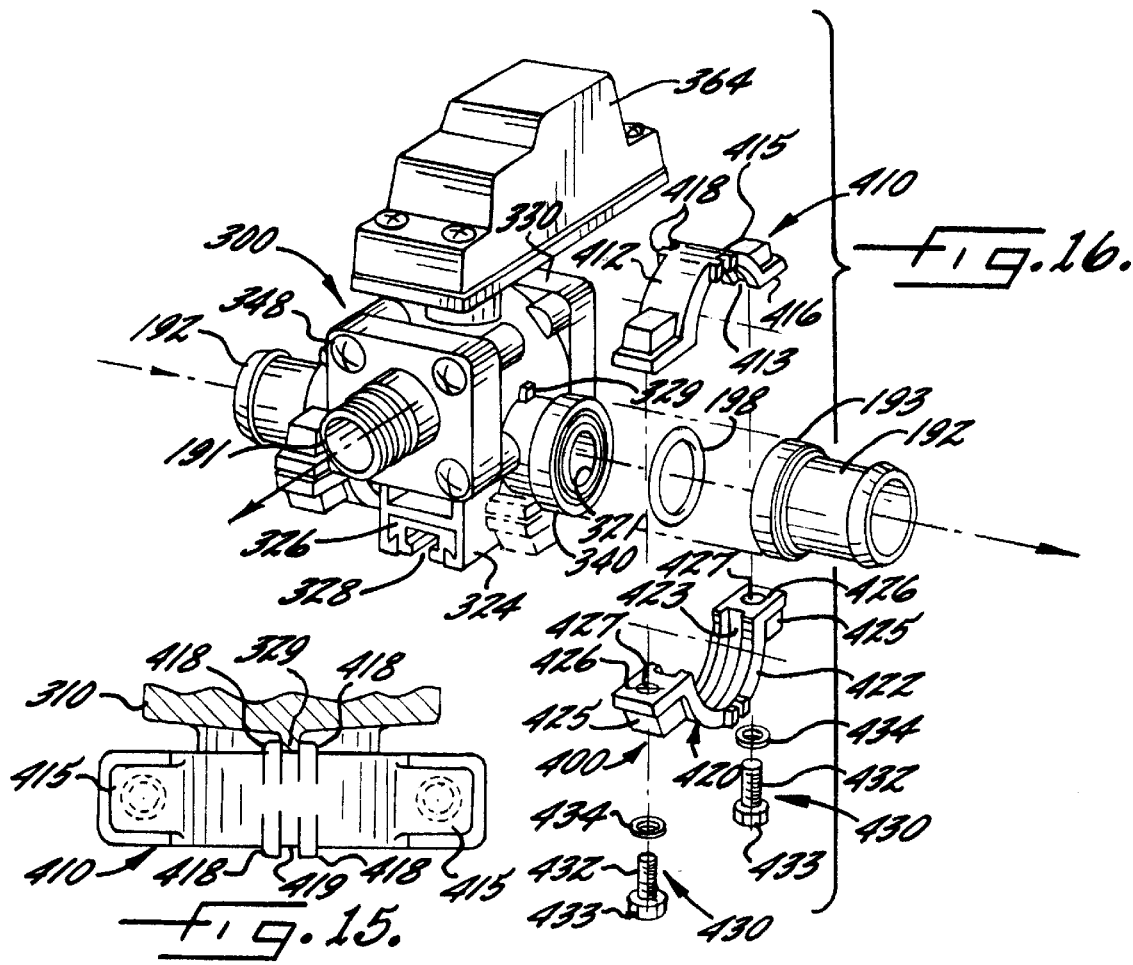

6,036,107

CONTROL VALVE ARRANGEMENT FOR SPRAYING SYSTEMS

FIELD OF THE INVENTION

The present invention relates generally to control valves for spraying systems and, more particularly, to an arrangement of spray control valves that are coupled in ganged or manifold side-by-side aligned relationship with respect to each other.

BACKGROUND OF THE INVENTION

Agricultural sprayers typically have long spray booms with groups of spray nozzles that are selectively controlled by respective control valves, each of which is individually actuated to permit transmission or termination of liquid to the spray nozzles of the group. Termination of liquid to one or more groups of spray nozzles is commonly necessary, for example, near the ends of fields so as to prevent spraying on non-crop vegetation or the like. The control valves of such spraying systems are commonly mounted in ganged or manifold side-by-side aligned relationship with respect to each other and remote from the spray nozzles they control, with liquid being directed through the line of control valves. In addition, each control valve is customarily provided with a valve element which is movable between open and closed positions to selectively control the flow of liquid to the spray nozzles of the respective group. Previously, the mounting and coupling of such control valves has been cumbersome, required complicated fixtures, and has not enabled easy disassembly or uncoupling of individual control valves for repair or replacement. For example, it is known in the art to couple a plurality of the control valves in a side-by-side fluid communicating array with a plurality of elongated rods which extend through the valve bodies to retain the control valves in an assembled relationship. Not only is such mounting relatively complicated, but to remove and repair an individual control valve, it is necessary to disassemble the entire array. Moreover, it can be difficult to precisely align and orient the array of control valves with respect to each other. Known control valves also have inlet and outlet configurations which do not lend themselves to easy interconnection or which are not compatible for effective sealing with different types of supply and output line couplings or adapters. In addition, to mount a ganged assembly of control valves for a spraying system, it has often been necessary to utilize bracketry which requires relatively precise positioning of mounting holes. Furthermore, while it is desirable to use plastic components to reduce weight and cost, heretofore such plastic elements have been susceptible to breakage or overstressing when coupled to each other or to liquid supply and return lines.

Still further performance problems can occur when such ganged control valves are employed to regulate flow through outlets carrying a multiplicity of spray nozzles which are adapted to provide different flow rates and spray performances. For example, adjusting one set of spray nozzles to provide a desired flow rate therethrough can increase or decrease pressure within the spraying system which can alter the flow rate through other nozzles, either increasing or decreasing the chemical application beyond the preferred limits. In addition, while it is known for control valves to be operable for directing fluid to a bypass line during periods in which liquid communication to the nozzles has been terminated and for controlling the bypass flow rate to correspond with that of the flow rate of the nozzles in use, adjusting the bypass flow rate heretofore has been tedious and time consuming. Moreover, control valves for use with a bypass line, referred to as three-way valves, require additional components, and have not been easily convertible for use as a two-way valve in spray systems which do not include a bypass line.

OBJECTS AND SUMMARY OF THE INVENTION

Accordingly, a general object of the present invention to provide a control valve which is adapted for easy coupling with other control valves in a ganged or manifold side-by-side aligned relationship with respect to each other.

Another object of the invention is to provide a control valve as characterized above which is adapted for easy interconnection with additional control valves and is compatible for effective sealing with different types of supply and output line adapters or couplings.

A further object of the invention is to provide a control valve of the foregoing type wherein the coupling of adjacent control valves automatically establishes a predetermined alignment of the valves.

Still another object of the invention is to provide a control valve of the above kind which includes an improved and simplified mounting arrangement.

An additional object of the invention is to provide a control valve which permits easy disassembly and replacement of the valve from a ganged mounting arrangement.

A further object of the invention is to provide a control valve as characterized above which includes a mechanism for permitting selective adjustment of bypass flow rates in a manner consistent with flow rates through its spray nozzles.

Still another object is to provide such a control valve of modular construction which is easily convertible from a three-way valve, for use with spraying systems with a bypass line, to a two-way valve, for use with spraying systems without a bypass line, and vice versa.

Yet another object of the invention is to provide a control valve of the foregoing type which is relatively simple and economical in construction, and which lends itself to reliable operation and use.

These and other objects, features, and advantages of the invention will become more readily apparent upon reading the following detailed description of the preferred embodiment, and upon reference to the accompanying drawings wherein:

BRIEF DESCRIPTION OF THE DRAWINGS

FIG. 6 is a rear end view of the control valve taken in the plane of line 6—6 in FIG. 4;

FIG. 7 is a partially fragmentary section of the group of control valves taken in the plane of line 7—7 in FIG. 4;

FIG. 10 is a vertical section of one form of adapter that can be secured to the control valves with the mounting clamp shown in FIGS. 8 and 9;

FIG. 11 is a vertical section of a second form of adapter attachable to the control valves with the mounting clamp shown in FIGS. 8 and 9;

FIG. 12 is a vertical section of a third form of adapter attachable to the control valves with the mounting clamp shown in FIGS. 8 and 9;

FIG. 13 is a vertical section of a fourth form of adapter attachable to the control valves with the mounting clamp shown in FIGS. 8 and 9;

FIG. 14 is a section, similar to FIG. 2, but showing a two-way control valve in accordance with the present invention;

FIG. 15 is an enlarged top plan view of a mounting clamp, taken in the plane of line 15—15 in FIG. 14, for mounting one of the control valves of the group to either an adjacent control valve or to an adapter;

FIG. 16 is a partially exploded perspective view of one of the control valves depicted in FIG. 14.

Figure 1:
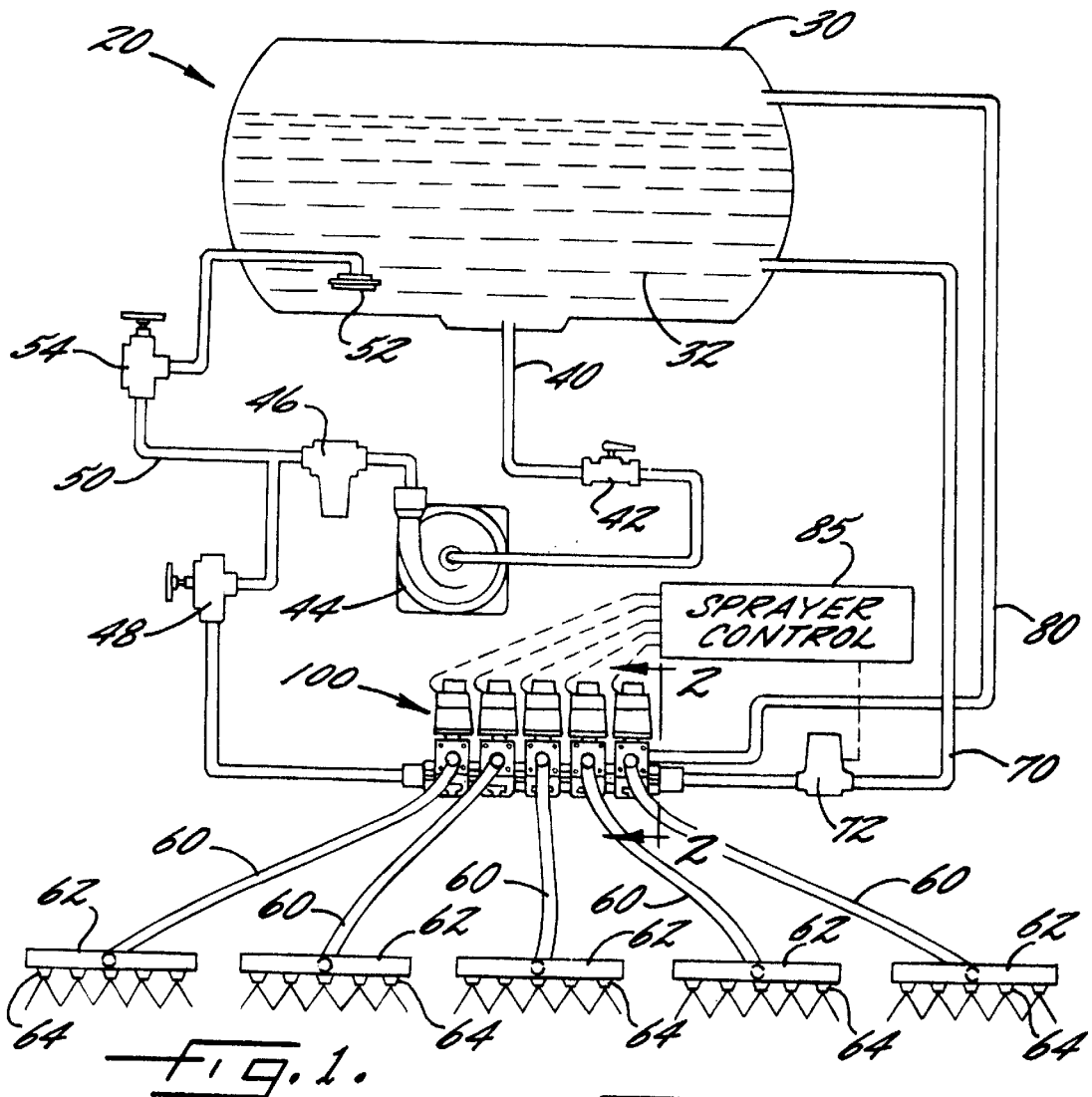
FIG. 1 is a schematic diagram of an illustrative spraying system having a group of three-way control valves in accordance with the present invention and mounted in ganged or manifold side-by-side relation.
Figure 2:
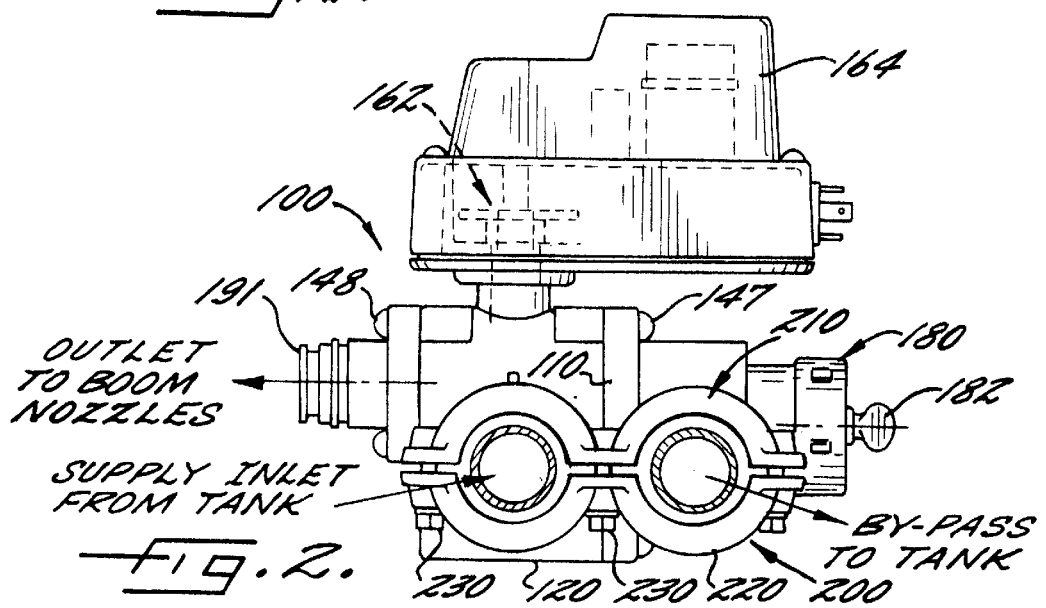
FIG. 2 is a vertical section of the group of control valves taken in the plane of line 2—2 in FIG. 1.

While the invention is susceptible to various modifications and alternative constructions, certain illustrated embodiments thereof have been shown in the drawings and will be described in detail below. It should be understood, however, that there is no intention to limit the present invention to the disclosed structural forms. On the contrary, the intention is to cover all modifications, alternative constructions, and equivalents that fall within the spirit and scope of the invention. Hence, while the present invention will be described in connection with control valves for an agricultural spraying system, it will be understood that the invention is equally applicable to other types of liquid transfer systems and valve arrangements.

DETAILED DESCRIPTION OF THE PREFERRED EMBODIMENTS

Referring now more particularly to FIG. 1 of the drawings, there is shown an illustrative agricultural spraying system 20 which includes a supply tank 30 for containing a quantity of liquid to be sprayed, a plurality of spray sections 62 each having a plurality of spray nozzles 64 through which liquid is discharged, and a group of spray control valves or liquid transfer members 100 constructed in accordance with the invention which are mounted in a ganged or manifold side-by-side relationship with respect to each other and are adapted to control the flow of liquid from the supply tank 30 to the spray sections 62. As is customary in agricultural sprayers, the spraying system 20 includes a supply line 40 between the supply tank 30 and the group of control valves 100 for transmitting liquid to the control valves 100, a discharge line 60 between each control valve 100 and respective spray sections 62 for delivering liquid to the spray sections 62, and a regulation line 70 between the group of control valves 100 and the supply tank 30 for facilitating regulation of the system pressure. The spraying system 20, in this case, includes a bypass line 80 between the group of control valves 100 and the supply tank 30 for returning liquid to the supply tank 30 which has been diverted away from the discharge lines 60 and their affiliated spray sections 62 by one or more of the control valves 100.

The supply line 40 of spraying system 20 includes a shut-off valve 42 which permits manual flow stoppage of liquid from the supply tank 30, a pump 44 which pressurizes liquid in the supply line 40, a strainer 46 for filtering debris from the supply line 40, and a throttling valve 48 which permits manual regulation of flow through the supply line 40. The supply line 40 also includes a return line 50 which, in the illustrated embodiment, branches off from the supply line 40 at a point downstream of the pump 44 and returns to the supply tank 30. As shown in FIG. 1, this return line 50 includes an agitator 52 located within the supply tank 30 which mixes the liquid 32 within the supply tank 30 based upon the flow rate through the return line 50. A throttling valve 54 is also provided along the return line 50 which may be manually adjusted to regulate the flow rate through the return line 50 and to adjust the mixing rate of the agitator 52.

The illustrated spraying system 20 is provided with a computer operated sprayer control 85 which is operatively connected to each of the control valves 100 of the group and to a regulating valve 72 located in the regulation line 70. In some operations, appropriate switches on the sprayer control 85 can be selectively activated to direct flow through either the discharge lines 60 for transmission through the nozzles 64 of the connected spray section 62 or through the bypass line 80 for return to the supply tank 30. At the end of a field, for example, some or all of the control valves 100 may be adjusted by the sprayer control 85 to direct flow through the bypass line 80, instead of through the discharge lines 60, in order to prevent application on non-crop vegetation. The sprayer control 85 also selectively adjusts the positioning of the regulating valve 72 based upon certain input information, such as flow rate, pressure, and/or speed, to directly regulate the pressure in the regulation line 70 which, in turn, regulates the flow rate through the discharge lines 60.

Figure 4:
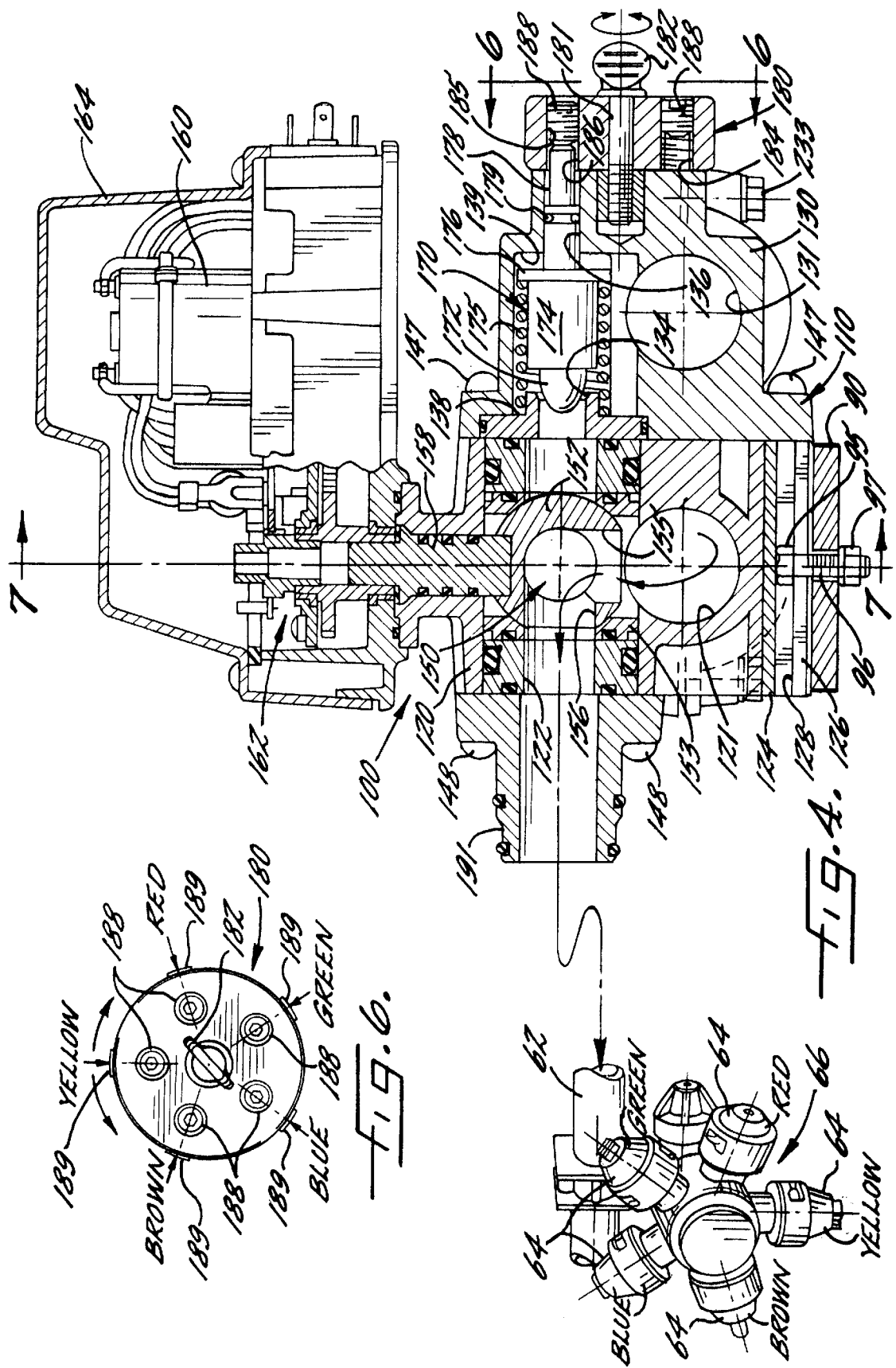
FIG. 4 is an enlarged vertical section of one of the control valves taken in the plane of line 4—4 in FIG. 3, and showing the control valve directing flow from a supply line to a discharge port.

Different field applications typically require different spray flow characteristics through the discharge nozzles 64 of the spray sections or booms 62. For this reason, each boom 62 may be provided with a multi-head sprayer 66, as shown, for example, in FIG. 4, having a plurality of nozzles 64 with different predetermined spray characteristics or flow rates. In the illustrated embodiment, the multi-head sprayer 66 includes five different color-coded spray nozzles 64—identified as "yellow", "brown", "blue", "green", and "red", respectively—and is manually rotatable with respect to the boom 62 to permit flow through one of the five spray nozzles 64. For example, when the multi-head sprayer 66 is positioned as shown in FIG. 4, the "yellow" spray nozzle 64 is activated and is in flow communication with the respective spray section or boom 62 to discharge a spray of liquid therethrough characteristic of that nozzle 64. The "brown", "blue", "green", and "red" spray nozzles 64, conversely, are each deactivated. Thus, when a specific spray flow characteristic is needed through the spray nozzles 64 of one of the booms 62, the spray nozzles 64 on the multi-head sprayer 66 of that boom 62 are each manually set to the color that provides the desired spray setting.

Figure 5:
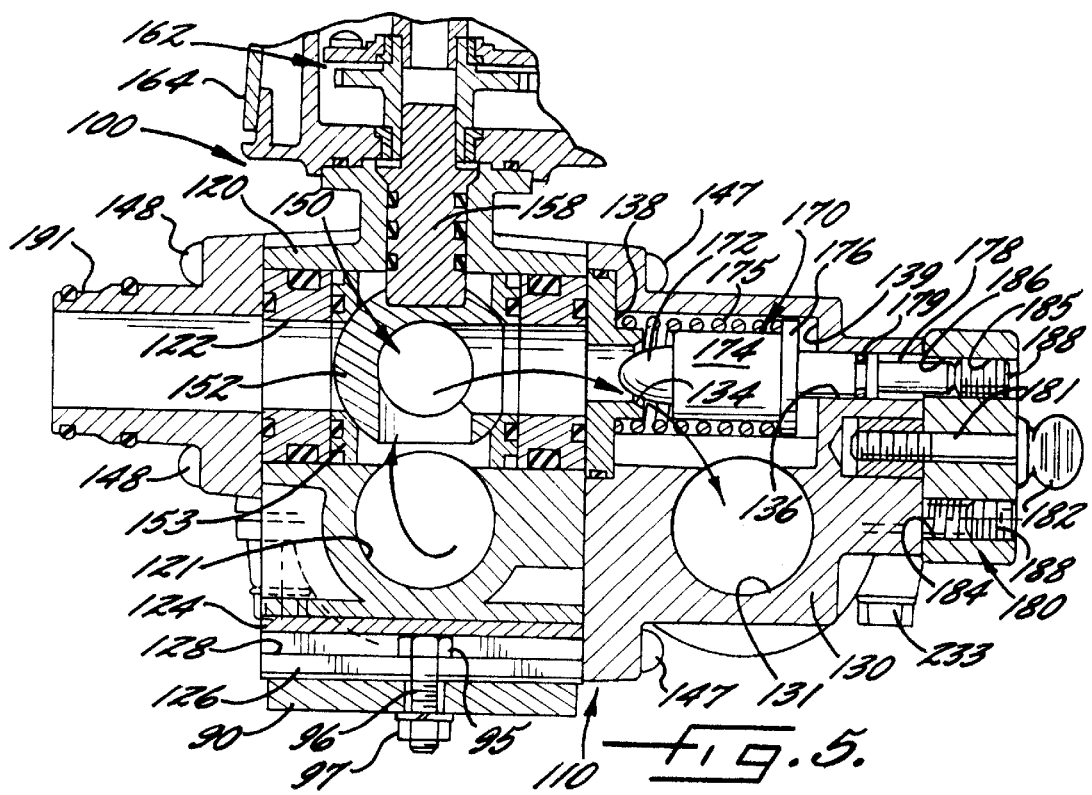
FIG. 5 is a partially fragmentary section, similar to FIG. 4, but showing the control valve directing flow from the supply line to a bypass port.

In order to accommodate a variety of different spraying systems 20, the control valves or liquid transfer members 100 of the present invention are of modular construction. In the embodiment depicted in FIGS. 1–7, for example, each of the control valves 100 includes a plastic housing structure or body 110 having a front section 120 and a separate rear section 130 which is assembled to the front section 120 with a plurality of fasteners 147. As best shown in FIGS. 4 and 5, the front section 120 of each housing 110 defines both a supply port 121 and a transverse discharge port 122 while the rear section 130 defines a bypass port 131. When the front and rear sections 120 and 130 of each housing 110 are assembled together, the supply port 121 is substantially parallel to the bypass port 131, but substantially perpendicular to the discharge port 122. To provide a suitable connection between the discharge ports 122 of each control valve 100 and the discharge lines 60 leading to the booms 62, a discharge port adapter 191 is also mounted to the front section 120 of each housing 110 with a plurality of fasteners 148. Because the control valves 100 shown in FIGS. 1–7 each have three ports 121, 122, and 131, they are sometimes referred to as "three-way" control valves.

Figure 3:
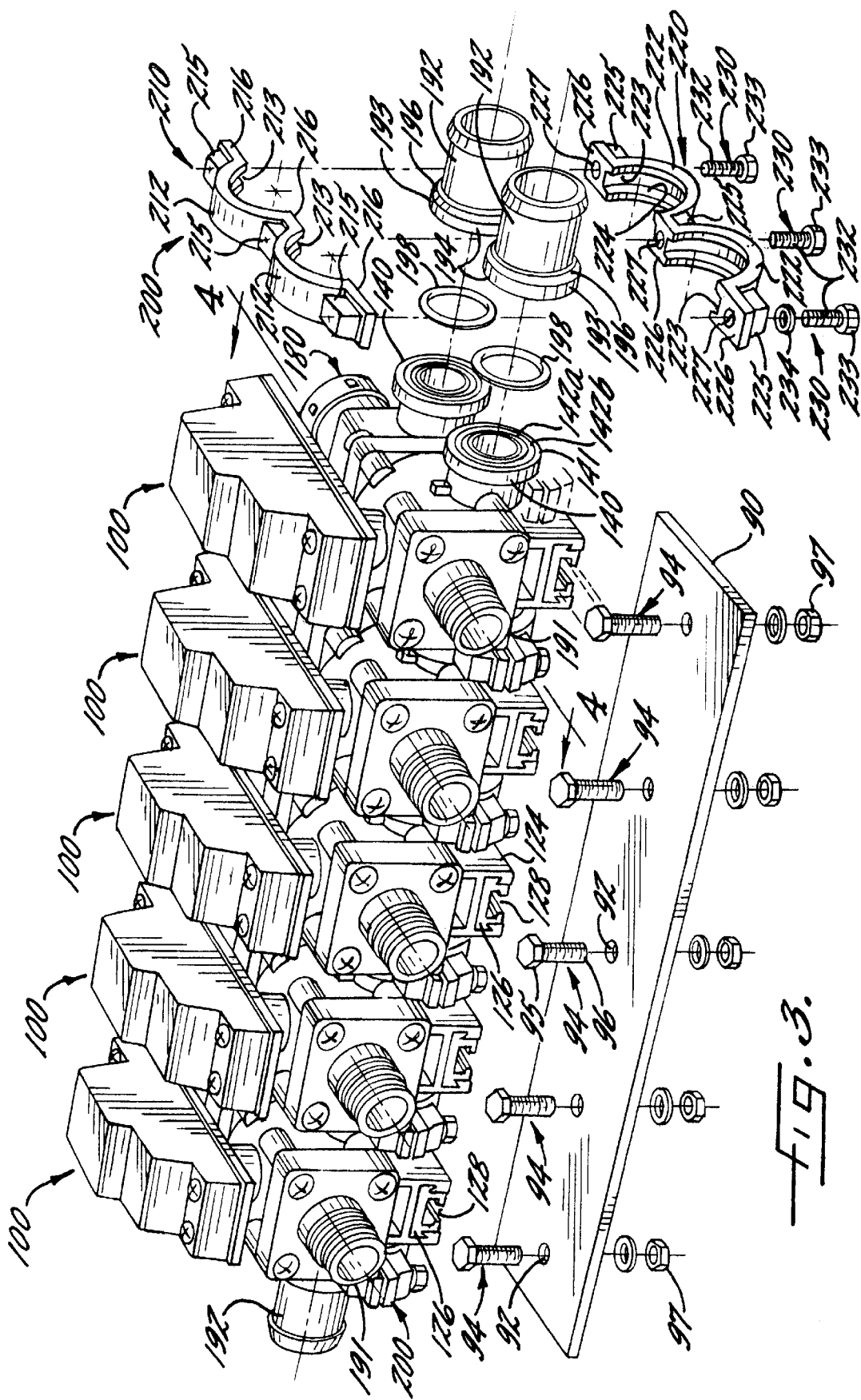
FIG. 3 is an enlarged and partially exploded perspective of the group of control valves depicted in FIG. 1.

The front and rear section 120 and 130 of each housing 110 is also provided with outwardly projecting retaining flanges 140 along the supply ports 121 and the bypass ports 131, respectively. As best shown in FIGS. 3 and 7, these outwardly projecting retaining flanges 140 are generally circular in configuration and have a flat abutment surface 141, with inner and outer annular grooves 142a and 142b formed therein, and an inwardly located tapered surface 143. As will be described more fully below, these retaining flanges 140 permit the control valves 100 of the group to be conveniently assembled to each other in a ganged or manifold side-by-side aligned relationship with respect to each other. In addition, these retaining flanges 140 also permit the two exterior control valves 100 of the group (i.e., the leftmost and rightmost control valves 100, as viewed in FIG. 7) to be conveniently assembled to an adapter 192 for connection with a liquid transfer line, such as the supply line 40, the regulation line 70, or with the bypass line 80. While other constructions are permissible and would certainly fall within the scope and spirit of the present invention, in the illustrated embodiment these retaining flanges 140 are integrally formed on the front and rear sections 120 and 130 of each housing 110, as shown, for example, in FIG. 7.

Once the control valves 100 have been assembled together as a group, as shown, for example, in FIGS. 1, 3, and 7, a first continuous flow passage is provided along the supply ports 121 of the group, and a second continuous flow passage is provided along the bypass ports 131 of the group. In addition, once the appropriate adapters 192 have been assembled onto the retaining flanges 140 of the two exterior or leftmost and rightmost, control valves 100 of the group, as viewed in FIG. 7, the leftmost end of the first continuous flow passage may be connected to the supply line 40, the rightmost end of the first continuous flow passage may be connected to the regulation line 70, and the rightmost end of the second continuous flow passage may be connected to the bypass line 80. Of course, in the spraying system 20 depicted in FIG. 1, the adapter 192 connected to the leftmost end of the second continuous flow passage should be in the form of a cap, as shown, for example, in FIG. 13, or any other adapter 192 which seals that end of the second continuous flow passage.

In order to selectively direct flow from the supply port 121 to either the discharge port 122 or the bypass port 131 of each control valve 100, a rotatable ball valve assembly 150 is provided within the housing 110 of each valve 100. As shown in FIGS. 4, 5, and 7, the ball valve assembly 150 includes a generally spherical member 152 which is positioned within the front section 120 of the housing 110 at the junction of the supply port 121 and the discharge port 122 and is rotatably supported above the supply port 121 by seals 153 on opposite axial sides thereof. The illustrated spherical member 152 has a three-way passage formed therein with a downwardly projecting and generally vertical passage segment 155 and two generally horizontal passage segments 156 and 157, respectively. More specifically, the first passage segment 155 communicates with the supply port 121, the second passage segment 156 is arranged substantially perpendicular to the first passage segment 155, and the third passage segment 157 is arranged substantially perpendicular to both the first passage segment 155 and the second passage segment 156.

To facilitate selected rotary positioning of the ball valve assembly 150 for directing flow through either the discharge port 122 or the bypass port 131, a stem 158 is affixed to the top of the spherical member 152 and projects outwardly from the top of the front portion 120 of the housing 110. As best shown in FIG. 4, the stem 158 is operatively connected to a motor 160 and to an affiliated gear train assembly 162 which are collectively encased within a protective covering 164. In operation, the motor 160 and gear train assembly 160 cooperate to selectively rotate the spherical member 152 of the ball valve assembly 150 ninety degrees between a first operating position, as shown in FIG. 4, and a second operating position, as shown in FIG. 5. In the first operating position, the second passage segment 156 of the spherical member 152 communicates with the discharge port 122 of the housing 110 to permit the flow of liquid from the supply port 121 to the discharge port 122, as shown in FIG. 4. In the second operating position, conversely, the third passage segment 157 of the spherical member 152 communicates with the bypass port 131 of the housing 110 through an opening 134 between the front and rear sections 120 and 130 of the housing 110 to permit the flow of liquid from the supply port 121 to the bypass port 131, as shown in FIG. 5.

In order to selectively regulate the flow of liquid through the bypass port 131, a movable plunger 170 is provided within the rear section 130 of each housing 110 between the ball valve assembly 150 and the bypass port 131. As best shown in FIGS. 4 and 5, the plunger 170 includes a generally catenoid-shaped end portion 172 which is partially received by opening 134, a cylindrical body portion 174, a disk-shaped platform portion 176, and a shaft portion 178 which is received by a similarly configured aperture 136 formed in the rear section 130 of the housing 110. A spring 175, such as a conventional helical compression spring, is provided for biasing the end portion 172 of the plunger 170 away from opening 134. In the illustrated embodiment, the spring 175 is coiled around the body portion 174 of the plunger 170 and is compressed between the platform portion 176 and an internal flange surface 138 formed in the rear section 130 of the housing 110. An O-ring 179 is provided around the shaft portion 178 of the plunger 170 for preventing leakage of liquid through aperture 136.

In keeping with an important aspect of the present invention, the movable plunger 170 interacts with a rotary end plate member 180 to selectively regulate the flow of liquid through the bypass port 131 in a manner consistent with the predetermined spray settings of the multi-head sprayers 66. As shown in FIGS. 4–6, the end plate member 180 is removably attached to the rear section 130 of the housing 110 with a single mounting bolt 181 which, in the illustrated embodiment, includes a manually grippable head portion 182 to facilitate convenient loosening and resecurement thereof. The end plate member 180 includes a plurality of internally threaded holes 184 formed therethrough which are adapted to receive engagement members in the form of set-screws 188. As shown in FIGS. 4 and 5, these set-screws 188 have substantially identical lengths, but are advanced into the internally threaded holes 184 of the end plate member 180 to different depths.

As best shown in FIG. 6, the holes 184 and set-screws 188 are located at circumferentially spaced rotational positions around the end plate member 180 and are provided with color-coded markings 189. In the illustrated embodiment, these color-coded markings 189 comprise strips of colored tape applied to the outer periphery of the end plate member 180 which are designated as "yellow", "brown", "blue", "green", and "red", respectively. Notwithstanding this characterization, it will be readily appreciated to those skilled in the art that other types of color coding markings 189 are permissible, including, for example, painting the outer periphery of the end plate member 180, painting the heads of the set-screws 188, or inserting colored plugs into the holes 184 of the end plate member 180. In any event, the color-coded markings 189 for the set-screws 188 correspond directly to the colors of the five different spray nozzles 64 on the multi-head sprayer 66 and serve to identify how deeply each set-screw 188 penetrates into the respective holes 184 of the end plate member 180.

When the end plate member 180 is secured to the rear section 130 of the housing 110 at a desired rotational orientation, the shaft portion 178 of the plunger 170 is received in one of the holes 184 of the end plate member 180 and is biased by the spring 175 into engagement with the set screw 188 in that hole 184. In this way, the engaged set-screw 188 serves as a stop for the shaft portion 178 of the plunger 170 and establishes the axial position of the plunger 170 within the rear section 130 of the housing 110. More specifically, the engaged set-screw 188 maintains the end portion 172 of the plunger 170 a predetermined distance away from the opening 134 of the housing 110 which provides a predetermined restriction in opening 134 and a corresponding flow resistance through the bypass port 131. Of course, since the set-screws 188 penetrate to different depths within the holes 184 of the end plate member 180, each set-screw 188 is calibrated to provide a different flow rate through the bypass port 131.

In the illustrated embodiment, for example, the set-screw 188 identified as "yellow" by the color-coded marking 189 on the rotary end plate member 180 is shown engaging the shaft portion 178 of the plunger 170 which maintains the end portion 172 of the plunger 170 a predetermined distance away from the opening 134 of the housing 110. Thus, when the ball valve assembly 150 of the control valve 100 is rotated into the second operating position, this predetermined distance between the end portion 172 of the plunger 170 and the opening 134 of the housing 110 regulates the flow of liquid through the bypass port 131 and provides a predetermined flow resistance therethrough. Of course, when the end plate member 180 is turned to so that a different set-screw 188 engages the shaft portion 178 of the plunger 170, the end portion 172 of the plunger 170 is maintained at a different predetermined distance away from opening 134 of the housing 110 which provides either a higher or lower flow rate through the bypass port 131. On account of this construction, the flow of liquid through the bypass port 131 may be selectively regulated simply by changing the rotational orientation of the end plate member 180 so that the set-screw 188 identified by the desired color engages the shaft portion 178 of the plunger 170.

In order to maintain substantially uniform pressure in the discharge lines 60 of the sprayer system 20 when flow through one or more of the control valves 100 is diverted through their respective bypass ports 131, the set-screws 188 of the end plate member 180 are manually adjusted by the user to match the capability of the color-coded spray nozzles 64 of the multi-head sprayers 66. In particular, each set-screw 188 selectively positions the plunger 170 within the rear section 130 of the housing 110 in a way that provides a flow resistance through the bypass port 131 which is substantially similar to the flow resistance through the correspondingly color-coded spray nozzles 64 of the multi-head sprayers 66. Thus, when the spray nozzles 64 on the multi-head sprayers 66 are set to a specific color to provide a desired flow rate therethrough, the set-screws 188 of the end plate member 180 should be set to the same color. Put another way, the set-screw 188 that engages the shaft portion 178 of the plunger 170, as identified by the color-coded markings 189 on the rotary end plate member 180, should match the color of the activated nozzles 64 on the multi-head sprayers 66. Without this matching feature, the flow diverted through the bypass port 131 of a given control valve 100 would have a different flow rate than that provided through the spray nozzles 64 on the boom 62 which, in turn, could adversely influence the pressure levels in the discharge lines 60 of other control valves 100.

In order to facilitate attachment of the control valves 100 to an external mounting structure, such as mounting plate 90 of FIG. 3, the front section 120 of each housing 110 includes a bottom mounting portion or base 124 which carries a metal insert member 126. In the illustrated embodiment, this metal insert member 126 has a downwardly opening T-shaped slot 128 which is adapted to receive a hex-headed portion 95 of a fastening bolt 94 in a non-rotational manner. On account of this construction, the upper hex-headed portion 95 of the bolt 94 may be retained in a fixed rotational position with respect to the housing 110, without the use of a wrench, while an internally threaded nut 97 is conveniently screwed onto a threaded lower end of the bolt 94. As such, the control valves 100 may be easily assembled to or disassembled from the mounting plate 90. For example, to assemble one of the control valves 100 onto the mounting plate 90, the upper hex-headed portion 95 of the bolt 94 is first installed within the T-shaped slot 128 of the insert member 126. Next, the threaded lower end 96 of the bolt 94 is then inserted through a hole 92 in the mounting plate 90 until the bottom mounting portion 124 of the housing 110 engages the plate 90. Finally, the nut 97 is screwed onto the threaded lower end 96 of the bolt 94 while the upper hex-headed portion 95 is retained in a fixed rotational position within the T-shaped slot 128 of the insert member 126. To disassemble one of the control valves 100 from the mounting plate 90, on the other hand, the nut 97 is simply unscrewed from the threaded lower end 96 of the bolt 94 while the upper hex-headed portion 95 is retained in a fixed rotational position within the T-shaped slot 128 of the insert member 126. In order to resist separation or spreading apart of the bottom mounting portion 124 during such assembly or disassembly of the control valves 100, a pair of cooperating angled surfaces are formed thereon which interact with angled surfaces formed on the metal insert member 126, as shown in FIG. 3.

In keeping with another important aspect of the present invention, the assembly and disassembly of adjacent interior control valves 100 of the group is greatly facilitated by a plurality of easy to use plastic mounting clamps 200 that are adapted to surround and releasably secure together the retaining flanges 140 of these adjacent control valves 100. As will be described in greater detail below, these plastic mounting clamps 200 also facilitate convenient assembly and disassembly of various adapters 192 to the exterior or leftmost and rightmost retaining flanges 140 of the group of control valves 100 for connection with the supply line 40, the regulation line 70, or the bypass line 80 of the spraying system 20.

Figure 8:
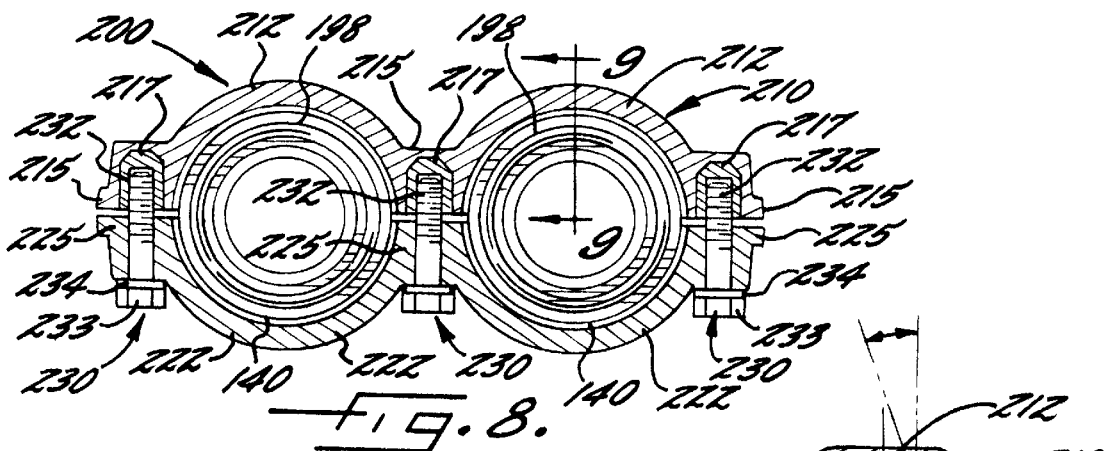
FIG. 8 is a vertical section of a mounting clamp, taken in the plane of line 8—8 in FIG. 7, for mounting one of the control valves of the group to either an adjacent control valve or to an adapter.
Figure 9:
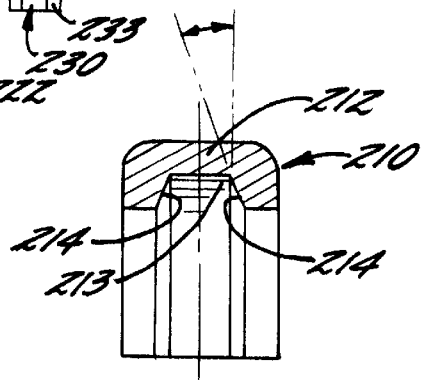
FIG. 9 is a fragmentary section of the mounting clamp, taken in the plane of line 9—9 in FIG. 8.

As depicted in FIG. 3, each illustrated mounting clamp 200 comprises a first plastic clamping member 210, a separate second plastic clamping member 220, and fasteners 230, such as bolts, for captively securing the first and second clamping members 210 and 220 together in surrounding relation about an adjacent pair of retaining flanges. In the illustrated embodiment, the first clamping member 210 includes a pair of generally semi-circular retaining sections 212 with securement sections 215 therebetween and at either end thereof. As best shown in FIG. 9, the retaining sections 212 of the first clamping member 210 each have an inwardly directed arcuate channel or recess 213 with a pair of tapered surfaces 214. Referring now to FIGS. 3 and 8, the three securement sections 215 of the first clamping member 210 each have a flat abutment surface 216 and a threaded metal insert 217 disposed therein for receiving respective fasteners 230. Like the first clamping member 210, the second clamping member 220 of the mounting clamp 200 includes a pair of generally semi-circular retaining sections 222 with respective securement sections 225 therebetween and at either end thereof. The semi-circular retaining sections 222 of the second clamping member 220 each have an inwardly directed arcuate channel or recess 223 with a pair of tapered surfaces 224 while the securement sections 225 of the second clamping member 220 each have a flat abutment surfaces 226 and a hole 227 therethrough. As is customary in the art, the fasteners or bolts 230 each have a threaded portion 232 and a head portion 233.

During assembly of the control valves 100 in ganged or manifold relation to each other, the semi-circular retaining sections 212 and 222 of the first and second clamping members 210 and 220 are initially positioned around either the retaining flange 140 of an exterior control valve 100 and a flange 193 of an adapter 192, as shown, for example, on the right-hand side of FIG. 3, or around the retaining flanges 140 of two adjacent interior control valves 100. In either event, the semi-circular retaining sections 212 and 222 are positioned in overlying relation such that the abutment surface 216 of the first clamping member 210 is substantially parallel to the abutment surface 226 of the second clamping member 220. Next, the threaded portions 232 of the bolts 230 are inserted through the holes 237 of the second clamping member 220 and into engagement with the threaded metal inserts 217 of the first clamping member 210. Thereafter, the head portions 233 of these bolts 230 are rotated with a wrench (not shown) or the like to tighten down the bolts 230 and to move the abutment surface 216 of the first clamping member 210 into opposing abutting engagement with the abutment surface 226 of the second clamping member 220 while the retaining sections 212 and 222 of the first and second clamping members 210 move together to captively secure the retaining flanges 140 of the control valves 100 to each other or to the flanges 193 of the adapters 192. In addition, the tapered surfaces 214 and 224 on the retaining sections 212 and 222 interact with the tapered surfaces 143 on the retaining flanges 140 and/or the tapered surfaces 196 of the adapters 192 to draw the abutment surfaces 141 of the retaining flanges 140 and/or the abutment surfaces 194 of the adapters 192 into tight abutting sealing engagement, as shown in FIG. 7. A washer 234, in this case, is disposed around the threaded portion 233 of each bolt 230 to space the head portion 233 of that bolt 230 away from the securement section 225 of the second clamping member 220.

In order to avoid overstressing and possibly damaging the first and second plastic clamping members 210 and 220 as the bolts 230 are being tightened down, the abutment surface 216 of the first clamping member 210 is designed to bottom out against or engage the abutment surface 226 of the second clamping member 210 when a predetermined tightening force has been applied to the bolts 230. In addition, the first and second clamping members 210 and 220 are prevented from rotating with respect to the housings 110 of the control valves 100 while the bolts 230 are being tightened down due to engagement between the two semi-circular retaining sections 212 and 222 of the first and second clamping members 210 and 220 and the two retaining flanges 140 of the control valves 100.

During disassembly of one or more of the control valves 100 from the group, the mounting clamps 200 on either side of that control valve 100 are disconnected to free its retaining flanges 140. In particular, the bolts 230 of the two mounting clamps 200 on either side of that control valve 100 are rotated to withdraw the bolts 230 from the threaded metal inserts 217. Upon fully withdrawing these bolts 230, the first and second clamping members 210 and 210 become de-coupled which releases the retaining flanges 140 of the control valve 100. Of course, once the first and second clamping members 210 and 210 have been de-coupled, the nut 97 attaching the control valve 100 to the mounting plate 90 is then turned to release the control valve 100 from the mounting plate 90. In this way, the mounting clamps 200 facilitate convenient assembly and disassembly of the control valves 100.

In keeping with another aspect of the present invention, the retaining flanges 140 formed on the housing 110 of each of the control valves 100 may be attached to different types of adapters 192. By way of non-limiting example, these retaining flanges 140 may be attached to: (1) the adapter 192 shown at the right-hand side of FIG. 3; (2) an adapter 192 with a narrower outlet, as shown in FIG. 10; (3) an adapter 192 with an internally threaded end portion, as shown in FIG. 11, which is adapted for removable attachment to an externally threaded pipe or the like; (4) an adapter 192 with a narrow internally threaded port, as shown in FIG. 12, which is adapted for attachment to a gauge or the like; and (5) a cap 192, as shown in FIG. 13, which is adapted for sealing the supply port 121, the outlet port 122, or the bypass port 131. These adapters 192 include flanges 193 which are similar in configuration to the retaining flanges 140 on the control valves 100. In fact, like the retaining flanges 140, the flanges 193 of the adapters 192 each have a generally circular configuration and are provided with a flat abutment surface 194, with inner and outer annular grooves 195a and 195b formed therein, and inward tapered surface 196.

In addition to providing convenient attachment to a variety of different adapters 192, these retaining flanges 140 and, more particularly, the inner and outer annular grooves 142a and 142b formed in the abutment surfaces 141 of these retaining flanges 140 are adapted to accommodate different types and sizes of sealing members. In particular, the outer annular groove 142b of these retaining flanges 140 is adapted to accommodate an O-ring 198, as shown, for example, in FIGS. 10 and 11, and the inner annular groove 142a is adapted to accommodate a flat annular sealing member of smaller diameter, such as gasket 199. Similarly, the outer annular groove 195b formed in the abutment surfaces 194 of the adapters 192 is adapted to accommodate O-ring 198 and the inner annular groove 195a of the adapter 192 is adapted to accommodate the flat annular sealing member or gasket 199. Thus, when either of these sealing members 198 or 199 is installed within the annular grooves 142a, 142b, 195a, and/or 195b of adjacent control valves 100 and/or adapters 192 and the mounting clamp 200 is assembled thereon, as shown, for example, in FIG. 7, a tight seal is provided between the control valves 100 and/or the adapters 192.

A second embodiment of the control valves 300 is shown in FIGS. 14–16. In this embodiment, the control valves 300 are similar in construction to the first embodiment of control valves 100, as depicted in FIGS. 1–7, but there are some structural differences. For example, each control valve 300 of the second embodiment includes a plastic housing structure 310 which defines both a supply port 321 and a transverse discharge port 322. Each control valve 300 also includes a cover plate 330 (in lieu of rear section 130) which is assembled to the housing 310 with a plurality of fasteners 347. As such, the second embodiment of the control valves 300 have no bypass ports, nor does the spaying system 20 to which they are connected have a bypass line 80. Because the control valves 300 shown in FIGS. 14–16 each have two ports 321 and 322, they are sometimes referred to as "two-way" control valves.

In keeping with an important aspect of the present invention, the "two-way" control valve 300 shown in FIG. 14–16 can be easily converted into the "three-way" control valve 100 shown in FIGS. 1–7 and vice versa. In fact, due to their modular constructions, each of the control valves 100 and 300 may be converted into the other by following a few simple steps. For example, the second embodiment of the control valve 300 may be easily converted into the first embodiment of the control valve 100 simply by removing the cover plate 330 and replacing it with rear section 130. Likewise, the first embodiment of the control valve 100 can be easily converted into the second embodiment of the control valve 300 simply by removing the rear section 130 and replacing it with cover plate 330.

Like the first embodiment of the control valve 100, a rotatable ball valve assembly (not shown) is provided within the housing 310 at the junction at the supply port 321 and the discharge port 322. This ball valve assembly is operatively connected to a motor (not shown) and a gear train assembly (not shown) which are collectively encased with a protective covering or shell 364. In order to provide a suitable connection between the discharge ports 322 of each control valve 300 and the discharge lines 60 leading to the booms 62, a discharge port adapter 191 is also mounted to each housing 310 with fasteners 348. Each housing 310 is also provided with a bottom mounting portion 324 having a metal insert member 326 which facilitates attachment of the control valve 300 to an external mounting structure, such as mounting plate 90 of FIG. 3, by holding the head of a bolt (not shown) in a fixed rotational position with respect to the housing 310.

In keeping with another important aspect of the present invention, each housing 310 is also provided with outwardly projecting retaining flanges 340 along its supply port 321. In practice, these retaining flanges 340 permit adjacent interior control valves 300 of the group to be conveniently assembled to and disassembled from each other. These retaining flanges 340 also permit the two exterior control valves 300 of the group to be conveniently assembled to and disassembled from adapters 192 for connection and disconnection with either the supply line 40 or the regulation line 70 of the spraying system 20. As in the previous embodiment, the assembly and disassembly of these control valves 300 to each other and to these adapters 192 is accomplished by plastic mounting clamps 400.

As best shown in FIG. 16, each mounting clamp 400 comprises a first plastic clamping member 410, a separate second plastic clamping member 420, and two fasteners 430, such as bolts, for captively securing the first and second clamping members 410 and 420 together. More specifically, the first and second clamping members 410 and 420 each have a generally semi-circular retaining section 412 and 422 with securement sections 415 and 425 at either end thereof. As with the mounting clamps 200 for the first embodiment of the control valves 100, the retaining sections 412 and 422 of the first and second clamping members 410 and 420 each have an inwardly directed arcuate channel or recess 413 and 423 with a pair of tapered surfaces. In addition, the securement sections 415 of the first clamping member 410 each have a flat abutment surface 416 and a threaded metal insert (not shown) disposed therein for receiving respective fasteners 430. The securement sections 425 of the second clamping member 420 each have a flat abutment surface 426 and a hole 427 therethrough. The clamp fasteners or bolts 430 each have a threaded portion 432 and a head portion 433. A washer 434, in this case, is disposed around the threaded portion 433 of each bolt 430 to space the head portion 433 of that bolt 430 away from the securement section 425 of the second clamping member 420.

The assembly and disassembly of the mounting clamps 400 to the retaining flanges 340 of the control valves 300 and/or to the flanges 193 of the adapters 192 is substantially the same as, and is described more fully above in connection with, the mounting clamps 200 for the first embodiment of the control valves 100. In addition to the various assembly features provided by the mounting clamps 200 for the first embodiment of the control valves 100, the mounting clamps 400 for the second embodiment of the control valves 300 have an alignment feature which prevents the first and second clamping members 410 and 420 from rotating with respect to the housings 310 as the bolts 430 are being tightened down. As best shown in FIG. 15, this alignment feature comprises a pair of spaced-apart ribs 418 formed on either side of the retaining section 412 of the first clamping member 410 which define aligning grooves 419 for receiving aligning lugs or tabs 329 formed on the housings 310 of the control valves 300. Thus, when these aligning grooves 419 receive the aligning lugs 329 of adjacent interior control valves 300, for example, the first clamping member 410 is preventing from rotating with respect to the housings 310 of these control valves 300. In addition to preventing rotation, this engagement between the aligning grooves 419 of the first clamping member 410 and the aligning lugs 329 of the control valves 300 maintains the abutment surfaces 416 and 426 of the first and second clamping members 410 and 420 substantially horizontal with respect to the housings 310 of the control valves 300 and maintains the fasteners 430 substantially vertical with respect to the housings 310 of the control valves 300.

Figure 17:
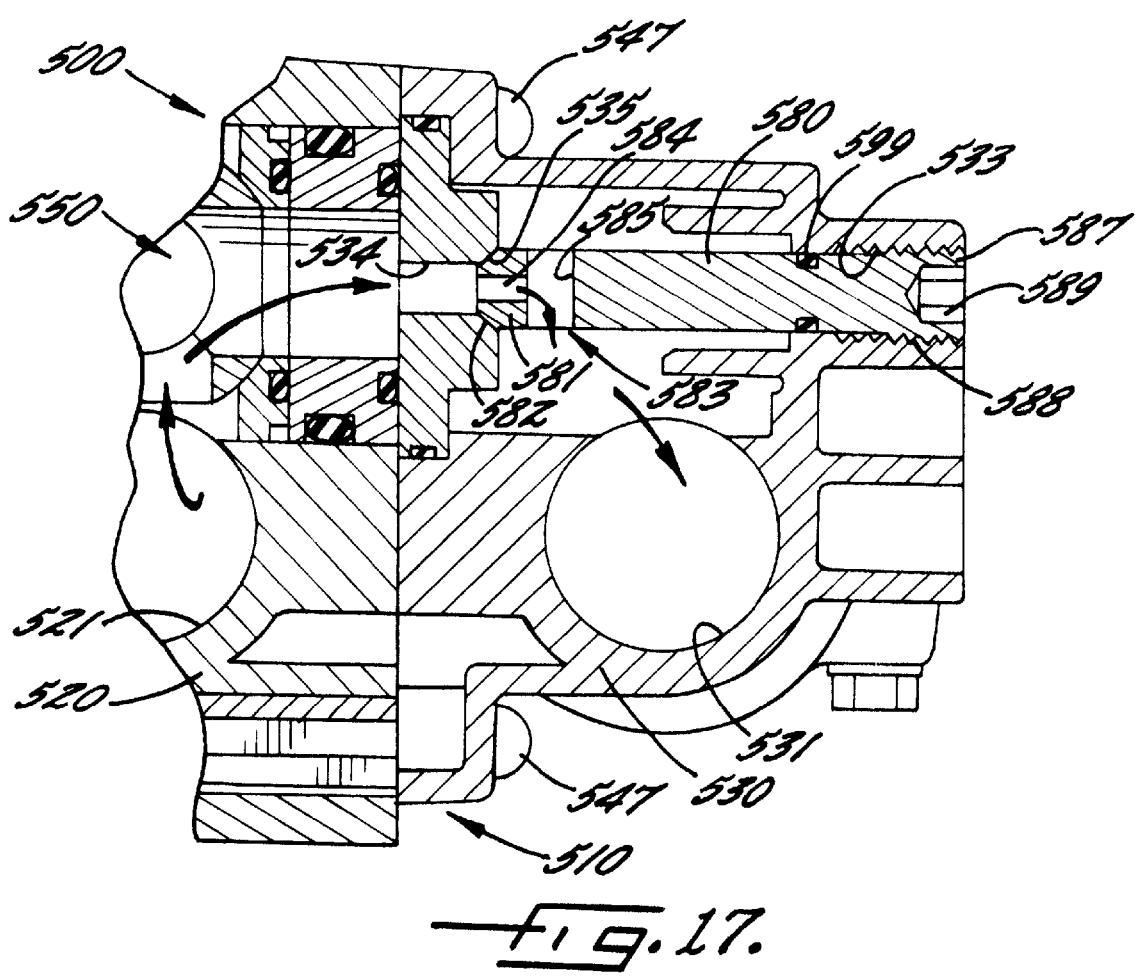
FIG. 17 is a section, similar to FIG. 4, but showing an alternative embodiment of a three-way control valve in accordance with the present invention.

An alternative embodiment of a three-way control valve 500 is shown in FIG. 17. In this embodiment, the control valve 500 comprises a plastic housing structure 510 having a front section 520 which is the same as or substantially equivalent to the front section 120 of control valve 100 and a separate rear section 530 which is removably assembled to the front section 520 with a plurality of fasteners 547. Like the first embodiment of the control valve 100, the front section 520 of the housing structure 510 defines both a supply port 521 and a transverse discharge port (not shown), and the rear section 530 of the housing structure 510 defines a bypass port 531. In order to selectively direct flow from the supply port 521 to either the discharge port or the bypass port 531, the front section 520 of the housing structure 510 is provided with a rotatable ball valve assembly 550 which is the same as or substantially equivalent to the ball valve assembly 150 of control valve 100.

In accordance with an important aspect of the present invention, the control valve 500 is provided with an engagement member 580 which communicates with an internal opening 534 disposed within the rear section 530 of the housing 510 to selectively regulate the flow of liquid through the bypass port 531. In the illustrated embodiment, this engagement member 580 includes a first end 581 which is adapted to abut the internal opening 534 of the rear section 530, as shown in FIG. 17, and a second end 587 which is adapted to threadably engage an external end portion 532 of the rear section 530. More specifically, the first end 581 of the engagement member 581 includes a tapered portion 582 which is adapted to engage a cooperating chamfer 535 formed around the internal opening 534 of the rear section 530, and a discharge passage 583 which is sized and configured to selectively regulate flow through the bypass port 531 when the tapered portion 582 is adjacent to the internal opening 534 and the rotatable ball valve assembly 550 is positioned to direct flow through the bypass port 531, as shown in FIG. 17. In the illustrated embodiment, the discharge passage 583 is formed through the first end 581 of the engagement member 580 and includes a front portion 584 which is substantially aligned with the internal opening 534 of the rear section 530 and a rear portion 586 which is substantially transverse to the front portion 585. The second end 587 of the engagement member 580, in turn, includes an externally threaded portion 588 which threadably engages an internally threaded hole 533 formed through the external end portion 532 of the rear section 530. The second end 587 of the engagement member 580 is also provided with an aperture 589 which is adapted to receive a tool, such as an allen head wrench or the like, to permit turning of the engagement member 580 with respect to the rear section 530 of the housing 510. In this way, the engagement member 580 may be rotated with respect to the rear section 530 of the housing 510 to either advance the first end 581 of the engagement member 580 toward the internal opening 534 or to retract the first end 581 of the engagement member 580 away therefrom. A sealing member, such as O-ring 599 or the like, may also be provided around the engagement member 580, as shown, for example, in FIG. 17, to prevent leakage through the internally threaded hole 533 formed through the rear section 530 of the housing 510.

As mentioned briefly above, the discharge passage 583 of the engagement member 580 is sized and configured to selectively regulate the flow of liquid through the bypass port 531. In the illustrated embodiment, for example, the front and rear portions 584 and 585 of the discharge passage 583 are each sized and configured or calibrated to provide a predetermined flow rate through the bypass port 531 when the tapered portion 582 of the engagement member 580 is adjacent to the internal opening 534 of the rear section 530 and the rotatable ball valve assembly 550 is positioned to direct flow through the bypass port 531. With the engagement member 580 shown in FIG. 17, for example, the front and rear portions 584 and 585 of the discharge passage 583 are calibrated to provide a specific predetermined flow rate through the bypass port 531. With other engagement members 580, however, the front and rear portions 584 and 585 of the discharge passage 583 may be calibrated to provide other predetermined flow rates through the bypass port 531.

On account of this construction, the control valve 500 may be selectively regulated to provide a desired flow rate through the bypass port 531 simply by supplying a plurality of engagement members 580 with different sized discharge passages 583 and by threadably installing the appropriate engagement member 580 within the rear end 530 of the housing 510 until the first end 581 thereof is adjacent to internal opening 534. Of course, the discharge passages 583 of these engagement members 580 should be sized and configured or calibrated in a manner which provides flow rates through the bypass port 131 which are consistent with the predetermined spray settings of the multi-head sprayers 66.

While the present invention has been described and disclosed in connection with an illustrated embodiment, it will be understood, of course, that there is no intention to limit the invention to the disclosed structural forms. On the contrary, the intention is to cover all modifications, alternative constructions, and equivalents that fall within the scope and spirit of the invention as defined by the following claims.

What is claimed is:

1. A spraying system comprising a plurality of spray sections, a respective discharge line coupled to each of the spray sections, a respective control valve coupled to each of the discharge lines for regulating the flow of liquid through each spray section, said control valves being mounted in a side-by-side array and each having a housing with outwardly projecting retaining flanges on opposite sides thereof, mounting clamps for releasably connecting together the retaining flanges of adjacent control valves and for securing said control valves in said array, said mounting clamps each including separate first and second clamping members, said clamping members each having a respective retaining section secured in overlying relation to the retaining flanges of adjacent control valves for captively securing the retaining flanges together, and said mounting clamps being selectively releasable from the flanges of a selected control valve for permitting removal of the selected control valve from the array.

2. The spraying system set forth in claim 1, wherein the retaining flanges of each control valve are integrally formed on their respective housings.

3. The spraying system set forth in claim 2, wherein the housings of the control valves are made of plastic.

4. The spraying system set forth in claim 1, wherein the mounting clamps are made of plastic.

5. The spraying system set forth in claim 1, wherein the first and second clamping members of each mounting clamp have respective securement sections at opposite ends thereof and fasteners for securing together the securement sections of the first and second clamping members in opposing relation to each other.

6. The spraying system set forth in claim 5, wherein the securements sections of the first and second clamping members each have an abutment surface.

7. The spraying system set forth in claim 6, wherein the first and second clamping members of each mounting clamp are secured by the fasteners with the abutment surfaces thereof in opposing abutting engagement with each other.

8. The spraying system set forth in claim 6, wherein the abutment surfaces of the first and second clamping members are flat.

9. The spraying system set forth in claim 5, wherein the securement sections of the first clamping member each have a respective hole for receiving one of the fasteners and the securement sections of the second clamping member each have a respective threaded insert in aligned relation with respective holes in the first clamping member for threaded engagement by said fastener.

10. The spraying system set forth in claim 1, wherein the retaining sections of the first and second clamping members are generally semi-circular in shape and are formed with an inwardly directed channel which receives the retaining flanges of adjacent control valves.

11. The spraying system of claim 1 in which the retaining sections of the first and second clamping members are formed with tapered side walls that engage and draw the retaining flanges of adjacent control valves into secure relation to each other as an incident to securement of the retaining flanges by said clamping members.

12. The spraying system of claim 11 in which said retaining flanges each are formed with a respective tapered side wall for cooperating with the tapered walls of the clamping members.

13. The spraying system set forth in claim 1, wherein the control valves are mounted in a row and define a continuous flow passage through the control valves.

14. The spraying system set forth in claim 13, further including a supply line for communicating liquid to the continuous flow passage of the control valves, the supply line having an adapter with a flange formed thereon for connection to the retaining flange of one of the control valves with a further mounting clamp, the further mounting clamp including first and second clamping members, each clamping member having a respective retaining section secured in overlying relation to the retaining flange of said control valve and the flange of said adapted for captively securing said flanges together.

15. The spraying system set forth in claim 14, wherein the adapter for the supply line adapter is connected to the retaining flange of a first control valve in said row of control valves.

16. The spraying system set forth in claim 14, wherein the adapter is connected to the retaining flange of a last control valve in said row of control valves.

17. The spraying system of claim 11 including a resilient sealing member in interposed between the retaining flanges of adjacent control valves.

18. The spraying system set forth in claim 1, wherein each control valve includes a respective supply port, a respective discharge port, and a respective bypass port, each control valve also including a rotatable ball valve assembly contained within the housing for selectively directing flow from the supply port to one of the discharge port and the bypass port.

19. The spraying system set forth in the claim 18, wherein each control valve includes a spring-biased plunger disposed between the ball valve assembly and the bypass port for selectively regulating flow through the bypass port.

20. A spraying system comprising a plurality of spray sections, a respective discharge line coupled to each of the spray sections, a respective control valve coupled to each of the discharge lines for regulating the flow of liquid through each spray section, said control valves being mounted in side-by-side relation and each having a housing with outwardly projecting retaining flanges, mounting clamps for connecting together the retaining flanges of adjacent control valves, said mounting clamps each including separate first and second clamping members, said clamping members each having a respective retaining section secured in overlying relation to the retaining flanges of adjacent control valves for captively securing the retaining flanges together, said control valves each including a respective supply port, a respective discharge port, and a respective bypass port, said control valves each having a rotatable ball valve assembly contained within the housing for selectively directing flow from the supply port to one of the discharge port and bypass port, and said control valves each having an engagement member which cooperates with an internal opening disposed within the housing of the control to selectively regulate flow through the bypass port.

21. The spraying system set forth in the claim 20, wherein the engagement member includes a first end which is adapted to abut the internal opening of the housing and a second end which is adapted to threadably engage an external end of the housing.

22. The spraying system set forth in the claim 21, wherein the first end of the engagement member includes a discharge passage formed therethrough which is sized and configured to selectively regulate flow through the bypass port when the second end of the engagement member is adjacent to the internal opening of the housing and the rotatable ball valve assembly is positioned to direct flow from the supply port to the bypass port.

23. The spraying system set forth in the claim 21, wherein the discharge passage of the engagement member is calibrated to provide a predetermined flow rate through the bypass port.

24. A spraying system comprising a plurality of spray sections, a respective discharge line coupled to each of the spray sections, a respective control valve coupled to each of the discharge lines for regulating the flow of liquid through each spray section, said control valves being mounted in side-by-side relation and each having a housing with outwardly projecting retaining flanges, mounting clamps for connecting together the retaining flanges of adjacent control valves, said mounting clamps each including separate first and second clamping members, said clamping members each having a respective retaining section secured in overlying relation to the retaining flanges of adjacent control valves for captively securing the retaining flanges together, said control valves each including a respective supply port, a respective discharge port, and a respective bypass port, said control valves each having a rotatable ball valve assembly contained within the housing for selectively directing the flow from the supply port to one of the discharge port and bypass port, said control valves including a spring-biased plunger disposed between the ball valve assembly of the control valve and the bypass port for selectively regulating flow through the bypass port, said control valves each including an end plate member rotatably secured to the housing of the control valve for selective movement between a plurality of rotational positions, and said end plate member of each control valve including a plurality of engagement members, each engagement member limiting movement of the spring-biased plunger a different amount to selectively regulate the flow through the bypass port.

25. The spraying system set forth in claim 24, wherein each engagement member is in the form of a set-screw.

26. The spraying system set forth in claim 24, wherein the end plate member includes at least two engagement members which are received at different predetermined depths by respective holes formed through the end plate member and correspond to at least two rotational positions of the end plate member.

27. The spraying system set forth in claim 26, wherein the end plate member includes five engagement members which are received at different predetermined depths by five holes formed through the end plate member and correspond to five rotational positions of the end plate member.

28. A liquid transfer system comprising a plurality of liquid transfer members each having an outwardly projecting retaining flange, said liquid transfer members being disposed in a side-by-side array, each liquid transfer member having retaining flanges on opposite sides thereof, mounting clamps for releasably connecting together retaining flanges of adjacent liquid transfer members and for securing said liquid transfer members in said array, said mounting clamps each including separate first and second clamping members, said clamping members each having a respective retaining section secured in overlying relation to retaining flanges of adjacent liquid transfer members and respective securement sections at opposite ends thereof, each retaining section being formed with an inwardly directed recess for captively retaining flanges of adjacent liquid transfer members, each clamping member having a fastener for releasably securing together the securement sections of the first and second clamping members in opposing relation to each other, and said mounting clamps for a selected liquid transfer member being releasable by unfastening said fasteners for permitting removal of the selected liquid transfer member.

29. The liquid transfer system set forth in claim 28, wherein the liquid transfer members are made of plastic.

30. The liquid transfer system set forth in claim 28, wherein the mounting clamps are made of plastic.

31. The liquid transfer system set forth in claim 28, wherein one of said liquid transfer members is a body of a liquid control valve, said body having an inlet port, an outlet port, and integrally formed retaining flanges at said inlet and outlet ports.

32. The liquid transfer system set forth in claim 28, wherein one of said liquid transfer members is an adapter of a liquid transfer line.

33. The liquid transfer system set forth in claim 28, wherein two of said liquid transfer members are bodies of respective liquid control valves.

34. The liquid transfer system of claim 28 in which said retaining flanges each are formed with a respective tapered side wall, and the securement sections of the clamping members are operative for engaging the tapered side walls of adjacent retaining flanges and for drawing the retaining flanges into secured relation to each other as an incident to securement thereof by said mounting clamps.

35. The liquid transfer system set forth in claim 28, wherein installation of the clamping members onto adjacent retaining flanges establishes a predetermined alignment of respective liquid transfer members.

36. The liquid transfer system of claim 34 in which the retaining sections of said first and second clamping members are formed with respective inwardly directed channels having tapered side walls for engaging the tapered side walls of the retaining flanges secured thereby.

37. The liquid transfer system of claim 34 including a resilient sealing member interposed between the retaining flanges of adjacent liquid transfer members.

38. A spraying system comprising a plurality of spray sections, a respective discharge line coupled to each of the spray sections, a respective control valve coupled to each of the discharge lines for regulating the flow of liquid through each spray section, said control valves being mounted in side-by-side relation and each having a housing with outwardly projecting retaining flanges, mounting clamps for connecting together the retaining flanges of adjacent control valves, said mounting clamps each including separate first and second clamping members, said clamping members each having a respective retaining section secured in overlying relation to the retaining flanges of adjacent control valves for captively securing the retaining flanges together, each said housing and the retaining section of at least one of the first and second clamping members secured thereon defining an inter-engaging alignment lug and groove for facilitating proper alignment of the mounting clamp on the retaining flange of the housing and for preventing rotation of the mounting clamp with respect to the housing.

39. The spraying system set forth in claim 38, wherein each housing is formed with said alignment lug and the retaining section of at least one of the first and second clamping members includes a pair of spaced-apart ribs that define said groove which receives the alignment lug of the housing.

40. A spraying system comprising a plurality of spray sections, a respective discharge line coupled to each of the spray sections, a respective control valve coupled to each of the discharge lines for regulating the flow of liquid through each spray section, said control valves being mounted in side-by-side relation and each having a housing with outwardly projecting retaining flanges, mounting clamps for connecting together the retaining flanges of adjacent control valves, said mounting clamps each including separate first and second clamping members, said clamping members each having a respective retaining section secured in overlying relation to the retaining flanges of adjacent control valves for captively securing the retaining flanges together, said housing of each control valve including a mounting portion for positioning on a mounting structure, and said mounting portion of each housing having a slot for receiving and preventing rotation of a head of a mounting bolt for securing the mounting portion to the mounting structure.

41. A liquid transfer system comprising a plurality of liquid transfer members each having retaining flanges on opposite sides thereof, said retaining flanges each having an abutment surface thereon, said liquid transfer members each having a liquid flow passage communicating through the retaining flanges, said liquid transfer members being arranged in a side-by-side array with abutment surfaces of the retaining flanges of adjacent liquid transfer members in side-by-side relation to each other, releasable mounting clamps securing together the retaining flanges of adjacent liquid transfer members, said abutment surfaces of the retaining flanges each having inner and outer annular grooves formed therein which each are adapted to receive a respective sealing member about the liquid flow passage through the retaining flanges of adjacent liquid transfer members for preventing leakage between adjacently coupled liquid transfer members, and said mounting clamps of a selected liquid transfer member being releasable for permitting removal of the selected liquid from an adjacent liquid transfer member.

42. The liquid transfer system set forth in claim 41, wherein one of said liquid transfer members is a body of a liquid control valve, said body having an inlet port, an outlet port, and integrally formed retaining flanges at said inlet and outlet ports.

43. The liquid transfer system set forth in claim 41, wherein one of said liquid transfer members is an adapter of a liquid transfer line.

44. The liquid transfer system set forth in claim 41, wherein two of said liquid transfer members are bodies of respective liquid control valves.

45. The liquid transfer system set forth in claim 41, wherein the sealing member is an O-ring.

46. The liquid transfer system set forth in claim 45, wherein the O-ring is adapted to be received by the outer annular grooves of the retaining flanges.

47. The liquid transfer system set forth in claim 41, wherein the sealing member is a gasket.

48. The liquid transfer system set forth in claim 47, wherein the gasket is adapted to be received by the inner annular grooves of the retaining flanges.

49. The liquid transfer system set forth in claim 41, wherein the liquid transfer members are made of plastic.

50. The liquid transfer system set forth in claim 41, wherein the mounting clamps are made of plastic.

51. A liquid transfer system comprising a plurality of liquid transfer members each having an outwardly projecting retaining flange, said liquid transfer members being disposed in side-by-side relation with retaining flanges adjacent to each other, mounting clamps for connecting adjacent retaining flanges together, said mounting clamps each including separate first and second clamping members, said clamping members each having a respective retaining section secured in overlying relation to adjacent retaining flanges and respective securement sections at opposite ends thereof, said retaining sections being formed with an inwardly directed recess for captively securing adjacent retaining flanges together, said clamping members each having fasteners for securing together the securement sections of the first and second clamping members in opposing relation to each other, at least two of said liquid transfer members being bodies of respective liquid control valves, and at least one of the bodies being formed with an alignment lug, and the retaining section of at least one of the first and second clamping members for the body including a pair of spaced-apart ribs with a groove therebetween for receiving said alignment lug.

52. A spraying system comprising a plurality of spray sections, a respective discharge line coupled to each of the spray sections, and a respective control valve coupled to each of the discharge lines for regulating the flow of liquid through each spray section, the control valves being mounted in side-by-side relation and each having a housing with outwardly projecting retaining flanges and a mounting portion for positioning on a mounting structure, the mounting portion of each housing having a slot for receiving a head of a mounting bolt in a non-rotational manner.

53. The spraying system set forth in claim 52, wherein the slot of the mounting portion of each housing has a generally T-shaped configuration.

54. The spraying system set forth in claim 52, wherein the retaining flanges of adjacent housings are coupled together with a plastic mounting clamp having separate first and second clamping members.

55. The spraying system set forth in claim 54, wherein each clamping member includes a respective retaining section secured in overlying relation to the adjacent retaining flanges, each clamping member also including an inwardly directed channel for captively securing the adjacent retaining flanges together.

56. The spraying system set forth in claim 55, wherein each clamping member includes respective securement sections at opposite ends thereof and fasteners for securing together the securement sections in opposing relation to each other.

* * * * *